Aug. 11, 1959     S. P. SOLOW ET AL     2,898,805
IDENTIFICATION LEADER FOR MOTION PICTURE FILM
Filed Aug. 17, 1956
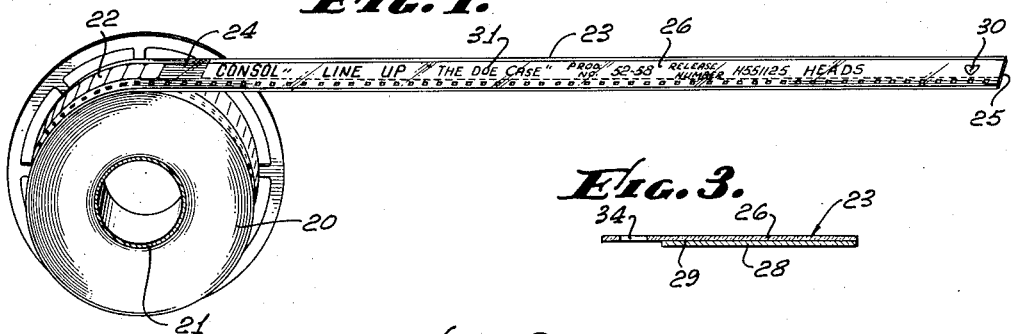
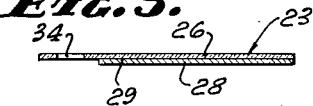
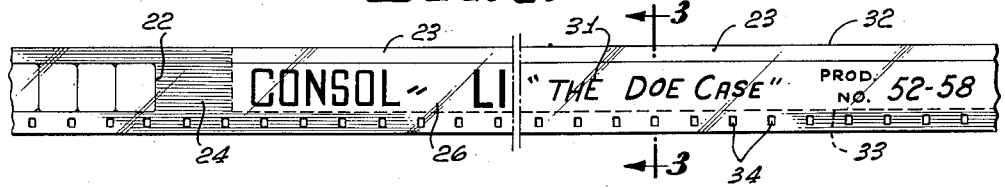
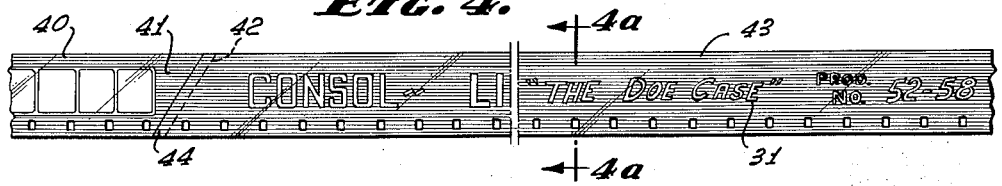
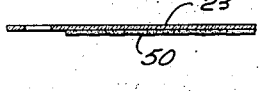
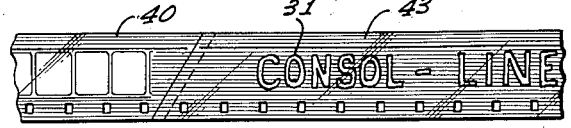
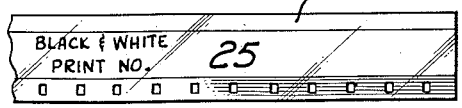
SIDNEY P. SOLOW
ROBERT H. YAMIN
              INVENTORS.
Huebner, Beehler, Worrel & Herzig.
BY
*[signature]*
              ATTORNEYS.

United States Patent Office 2,898,805
Patented Aug. 11, 1959

2,898,805

IDENTIFICATION LEADER FOR MOTION PICTURE FILM

Sidney P. Solow, Beverly Hills, and Robert H. Yamin, Encino, Calif.

Application August 17, 1956, Serial No. 604,846

1 Claim. (Cl. 88—19.5)

This invention relates to an identification leader for motion picture film, whether positive or negative. More particularly, the invention relates to a new and improved film leader of new and improved, readily legible, facile, and relatively foolproof and economical application, and having improved qualities of strength, wear and desired uniformity.

In the prior art of preparing rolls of film for use in projection or for storage, it is customary to provide a so-called white leader generally comprising a length of corresponding motion picture film in the form of raw stock, ordinarily slightly yellowish in appearance, and on which there is inscribed, conventionally by hand, the world "Head" in India ink, or the like, together with other appropriate identification, such as the name of the picture, the reel number, and the like desired or pertinent information. The purpose of the "white leader" or "head leader" is to indicate by the opaque white form thereof that the film on the reel is "head out" and is accordingly ready for projection without necessity for rewinding the same beforehand.

By way of contrast and for ease of identification the other or tail end of the roll of film is ordinarily indicated by means of a corresponding length of black opaque motion picture film referred to as a "tail leader."

In the extensive use of prints being made for motion pictures, and in particular for television stations, a large number of 16 mm. and the like prints of a subject may be required. Conventional practice calls for the affixation of a white or "head" leader to the beginning of print in the manner above described, and writing thereon, by hand, usually in ink, the information aforesaid, as well, for example, as the name of the producer, the title of the television series, the title of the particular episode, the number of such episode, the date on which the same is to be broadcast, and such further items of information or identification, or both, as is called for.

Occasionally the head leader is referred to as a protective leader, since it is commonly subjected to a considerable amount of wear and tear during projection because of its being the section of film normally handled by the projectionist to accomplish the threading of the projection machine.

Notwithstanding the above, the head leader conventionally consists of ordinary raw stock, as stated, and is therefore not as strong as circumstances would require. And this results in frequent replacement, because of its excessive mutilation after repeated uses or projections. In some cases, the information contained thereon is also mutilated, effaced or destroyed. In addition to requiring the individual attention of a person charged with inscribing and maintaining the desired information thereon, with attendant embarrassing and costly mistakes such as is involved, for example, in using a wrong title, number, date, or the like, it is also the practice to connect the white leader to the body of the film, i.e., at the lead end thereof, wherefore, said leader may not correspond to the particular film on which it is actually spliced, or if there is such desired correspondence, the splice used to connect such leader to the body of the film may come apart and the leader therefor separated. Again, the method of splicing raw stock and using pen and ink, or the like, or inscribing the desired information, involves an excessive expenditure of time and labor.

In view of the above and other consideration, it is an object of this invention to provide a new and improved head leader for motion picture, and the like, film.

It is also an object of this invention to provide such a new and improved head leader of high contrast with respect to information appearing thereon, which is accordingly rendered easily legible.

It is another object of this invention to provide a new and improved head leader of a desired character described having new and improved securement and unity with the main body of the film to which it relates.

Yet another object of this invention is the provision of a new and improved head leader of improved strength which is resistent to wear and tear of handling, and which is inseparable from its film body as compared to prior art devices heretofore intended to accomplish generally similar purposes.

Yet another object of this invention is the provision of a new and improved head leader of conventional white background, lending relief and contrast to letters, numbers, or other identification photographed thereon.

It is moreover among the objects of this invention to provide a new and improved means and/or methods of accomplishing the above stated objects and overcome the above mentioned objections to prior art devices superseded by the instant construction.

This invention has additionally among its objectives the substantial reduction or elimination of mistakes heretofore encountered in the use of conventional head leaders, the saving of time and labor, the elimination of splicing for each resultant print or body of film, the rendering obsolete of ordinary raw stock heretofore used for head leaders, as well as to make particular improvements over prior art devices of this general character.

Other objects and purposes will appear from the following description and considered in the light of the accompanying drawings and appended claim wherein like parts are designated by like reference numerals.

In the drawings:

Figure 1 is a perspective view of a roll of film incorporating a head leader of a preferred form embodying this invention.

Figure 2 is an enlarged fragmentary plan view of the head leader illustrated in Figure 1.

Figure 3 is a sectional view as on a line 3—3 of Figure 2.

Figure 4 is a view similar to Figure 2, but disclosing a negative from which the positive print of Figure 2 is derived, and also therefore illustrating a method of composing a portion of this invention or making a finished positive print embodying this invention.

Figure 4a is a sectional view taken as on line 4a—4a of Figure 4.

Figure 5 is a view similar to Figure 3, but illustrating another preferred form of head leader embodying this invention.

Figure 6 is a fragmentary plan view of a head leader portion and film portion associated therewith illustrating a third preferred embodiment of this invention.

Figure 7 is a plan view of a head leader fragment showing a means and method of adding individual identification, numbers, or the like, to individual positive prints.

Referring more particularly to the drawings, a body or roll of film 20, mounted upon a conventional reel 21, comprises a main strip or body portion 22, adapted to be projected on a screen or telecast, and an end portion 23, ordinarily approximately two or three feet long, constituting the head leader.

The head leader is preferably spaced from the film strip portion 22 as by means of a blank film portion 24.

The head leader itself comprehends that portion of the film extending from the end 25 to the blank portion 24. It includes, in the positive print illustrated in Figures 1, 2 and 3, a strip of film 26 continuous with the main film strip body 22 and integral therewith, and a layer of white opaque cellophane, or the like, material 28, closely adherent and cemented to the film portion 26 as by means of an adhesive or cement 29.

The film portion 26, in the positive print illustrated in said Figures 1 through 3, is transparent except for portions thereof comprising identification numerals and/or letters in the form of a black photographic image which appears in strong contrast against the white opaque background 28. Thus, in the embodiment of Figure 1, such designation on the head leader is: "'Consol.' Line Up 'The Doe Case' Prod. No. 52–58 Release No. H551125 Heads." An emblem or trademark 30 may also appear in addition to the other identification 31 last quoted.

While the entire head leader portion 26 of the film may be transparent, as indicated, it is preferable that the white opaque backing 28 comprise the strip extending only from the edge 32 to a position 33, spaced inwardly from the sprocket holes 34, so as not to interfere with the usual operation of the film projector.

By the above described construction, the identification information 30 and 31 comprises, advantageously, as stated, approximately the first two or three feet from the head end of the negative from which the main body of the print is made, so that the identifying information is photographically printed on the beginning of the print 23 (Figure 1) in the form of the substantially relatively dark letters and numerals or like identification 31. Since the head leader portion 26 otherwise provides a transparent background, the white opaque leader portion 28 makes the identification 30, 31, clearly visible and in the form of a white opaque leader similar in appearance to conventional head leaders and integral with the film portion 22 by virtue of the portion 26 integral and continuous therewith. The identification, as noted, is preferably read longitudinally of the leader and is of sufficient magnitude to be fully intelligible to the eye without magnification. By virtue of the reenforcement 28 the head leader is also stronger than the ordinary film portion 26 would be if unreenforced, and in any event, stronger than the customary raw film leader heretofore customarily employed.

In the production of the head leader, for the positive film of Figures 1 through 3, for example, a negative film strip 40, as shown in Figure 4, is cut through its blank portion 41, as along a line 42. A film strip negative 43 is spliced thereto in a conventional manner, along an area 44 of the negative film strip. The negative film strip portion 43 has the desired identifying information 31 photographically printed thereon.

Accordingly, when the positive print (Figures 1 through 3) is developed from the negative 40, 43, the letters and numbers or other identification 31 which appears on the negative 43 as white letters as against a black background will appear in the positive as the desired black letters and numbers 31 against the transparent background of the head portion 23 of the positive print.

The white opaque material 28, as in the form of a white opaque cellophane tape, is applied and adhered permanently to the underside of the positive print, as stated, so that the identification is clearly visible as black detail against the white opaque background of the material 28. Thus, the resultant leader is given said desired conventional white opaque appearance, having letters and numbers legibly and easily distinguishable thereon without the possibility of anyone making a mistake by writing the wrong information on the protective leader or head leader according to usual prior art practice.

A tape, such as 28, is applied very quickly so that the involved time and labor are materially reduced. The strength of the tape 28 when added to that of the leader portion 26 gives a resultant leader of greater strength than that of the film 22. Such leader possesses excellent resistance to the mutilation and handling to which, as stated, it is customarily subjected.

As indicated in Figure 5, another embodiment of the invention may consist of the application to the back of the positive film strip portion 23 of an adhering layer, coating, or laminate 50, in any desired color, preferably white but permissibly also even black, so that the information can appear as colored letters against a white or other contrasting background. Thus, the layer 50 can be in lieu of the tape 28, and is optionally achieved as by spraying, brushing, or otherwise, a suitable white ink, paint, or other such adherent material.

Further, as shown in Figure 6, the desired information 31 may be inscribed in the negative 43, e.g., into the emulsion thereof, by burning the emulsion, punching numbers or letters into the film or therethrough, or by applying separate adhering numbers, letters or designs, or the like, so that the final result consists of a photographic image in the positive print.

As illustrated in Figure 7, in view of the presence of the opaque white background, either 28 or 50, or other colored background, as indicated, any additional numerical or other identification may be applied to the leader. Thus, where a plurality of prints are made and it is desired to identify them separately, e.g., by number, from one another, additional information may be inscribed on the individual leader by pen and ink, or otherwise inscribing, punching, or adhering identifying characters as previously indicated. In said Figure 7, for example, the numeral "25" has been inscribed or printed upon the print as designated as "Black and White Print Number 25."

This invention features the provision of a means and method whereby a generally transparent leader containing letters having a color, or colors, may be employed against a background of a contrasting color, or colors, with the letters therefor strongly visible therethrough, the leader being stronger than ordinary film, and having superior resistance to wear and being foolproof in use and saving in time and labor as compared to prior art devices intended to accomplish similar purposes.

Although we have herein shown and described our invention in what we have conceived to be the most practical and preferred embodiment, it is recognized that departures may be made therefrom within the scope of our invention which is not to be limited to the details disclosed herein but is to be accorded the full scope of the claim so as to embrace any and all equivalent structures and methods.

Having thus described the invention, what is claimed as new is:

A roll of motion picture film comprising a film image portion and a leader section transparency, the leader section being a continuation at one end of the film image portion of the material from which the film image portion is formed and being of common dimensions with the film image portion whereby the place at which the film image portion continues as the leader section is of the same thickness and width as the film image portion and the leader section, said leader section transparency having visible photo image identification means of a first color thereon, sprocket holes continuous along an edge of said film, and a reinforcement backing means for said leader section and overlying substantially all of one face thereof except said sprocket holes closely adherent to said leader section and being of a second color contrasting with said first color to provide a background for said first color whereby said identification means is in visible contrast therewith for legibility, said backing means comprising a strip of opaque material adhesively secured to said leader.

References Cited in the file of this patent

UNITED STATES PATENTS

| | | |
|---|---|---|
| 1,065,135 | Ivatts | June 17, 1913 |
| 1,943,645 | Wallance et al. | Jan. 16, 1934 |
| 2,163,029 | Gage | June 20, 1939 |
| 2,286,834 | Rittenhouse | June 16, 1942 |
| 2,579,581 | Hustad | Dec. 25, 1951 |
| 2,751,294 | Morrison | June 19, 1956 |

FOREIGN PATENTS

| | | |
|---|---|---|
| 279,594 | Great Britain | Nov. 3, 1927 |